Figure 1:
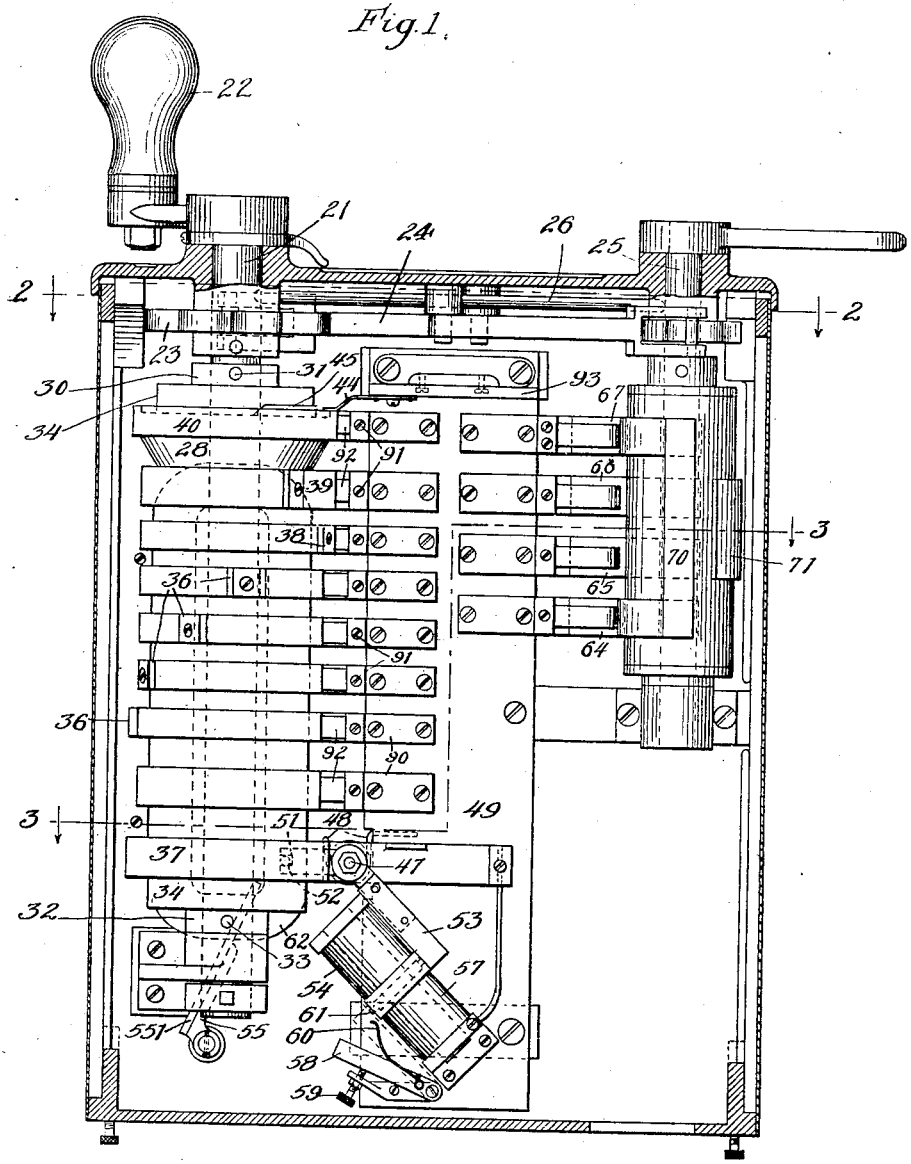

No. 763,031. PATENTED JUNE 21, 1904.
W. N. VANCE.
ELECTRIC MOTOR CONTROLLER.
APPLICATION FILED JUNE 29, 1903.
NO MODEL. 4 SHEETS—SHEET 1.

Witnesses:
Wm. Geiger
A. W. Munday

Inventor:
Walter N. Vance
By Munday, Evarts & Adcock,
Attorneys

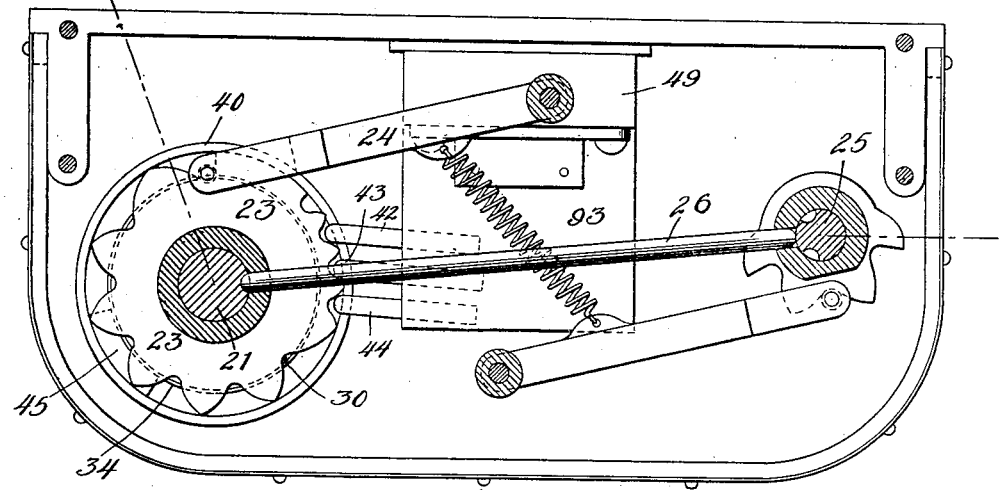
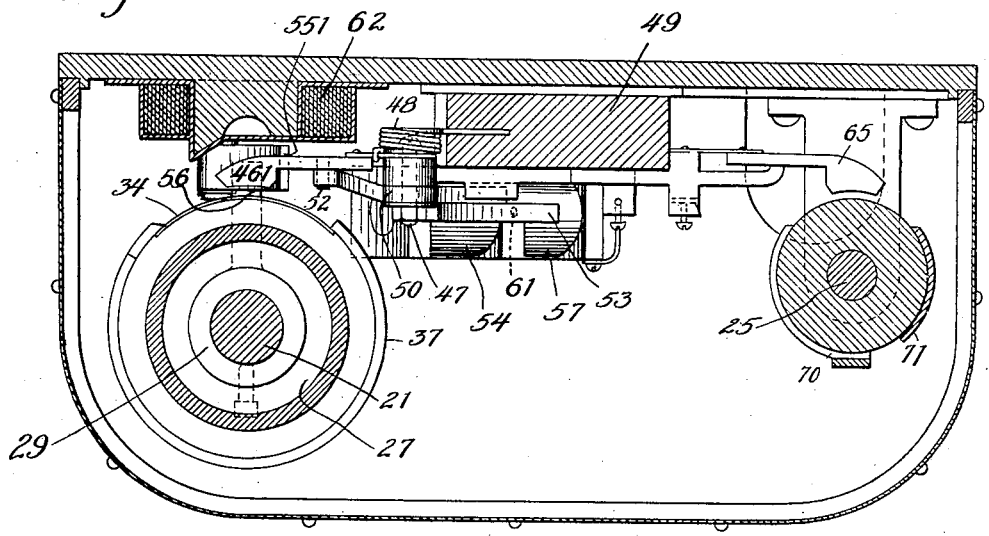
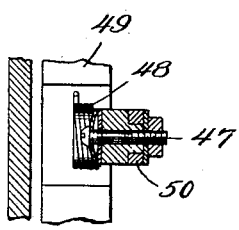

No. 763,031. PATENTED JUNE 21, 1904.
W. N. VANCE.
ELECTRIC MOTOR CONTROLLER.
APPLICATION FILED JUNE 29, 1903.
NO MODEL. 4 SHEETS—SHEET 3.
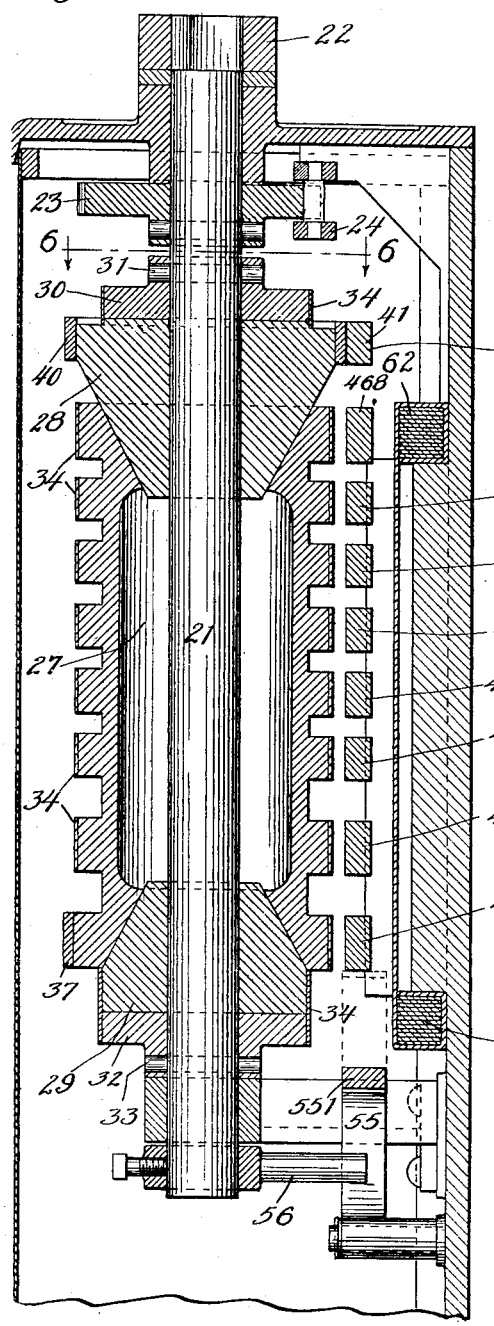
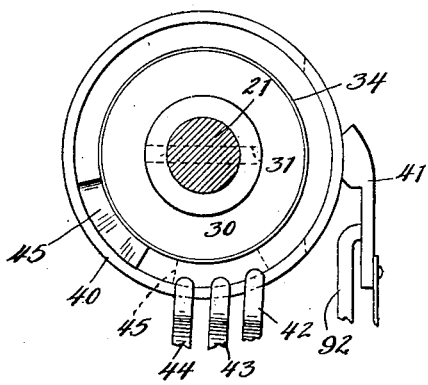
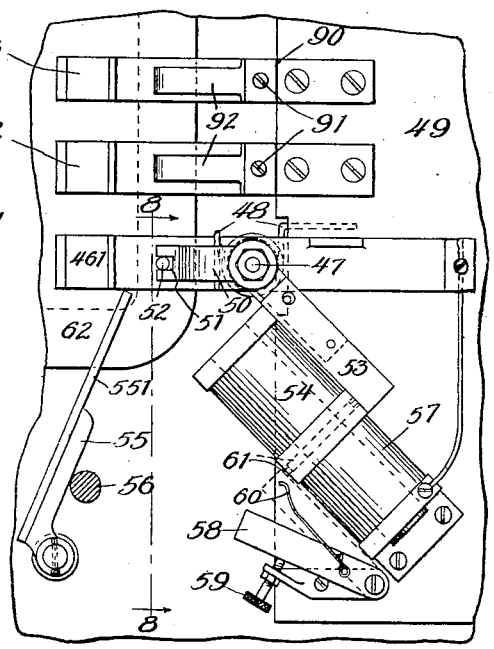
Witnesses:
Wm. Geiger
H. W. Munday
Inventor:
Walter N. Vance
By Munday, Evarts & Adcock,
Attorneys No. 763,031. PATENTED JUNE 21, 1904.
W. N. VANCE.
ELECTRIC MOTOR CONTROLLER.
APPLICATION FILED JUNE 29, 1903.
NO MODEL. 4 SHEETS—SHEET 4.
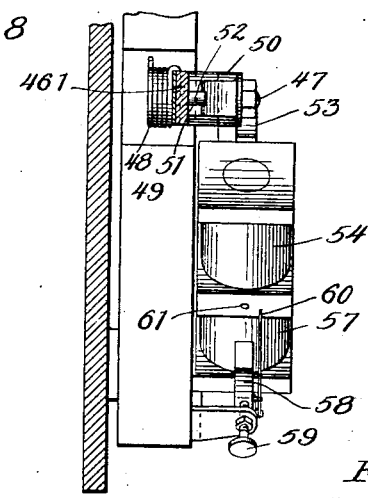
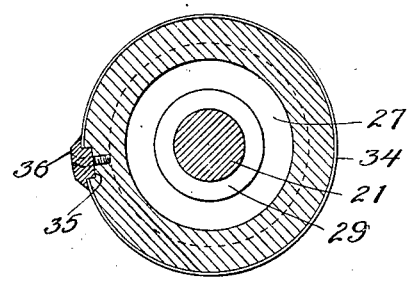
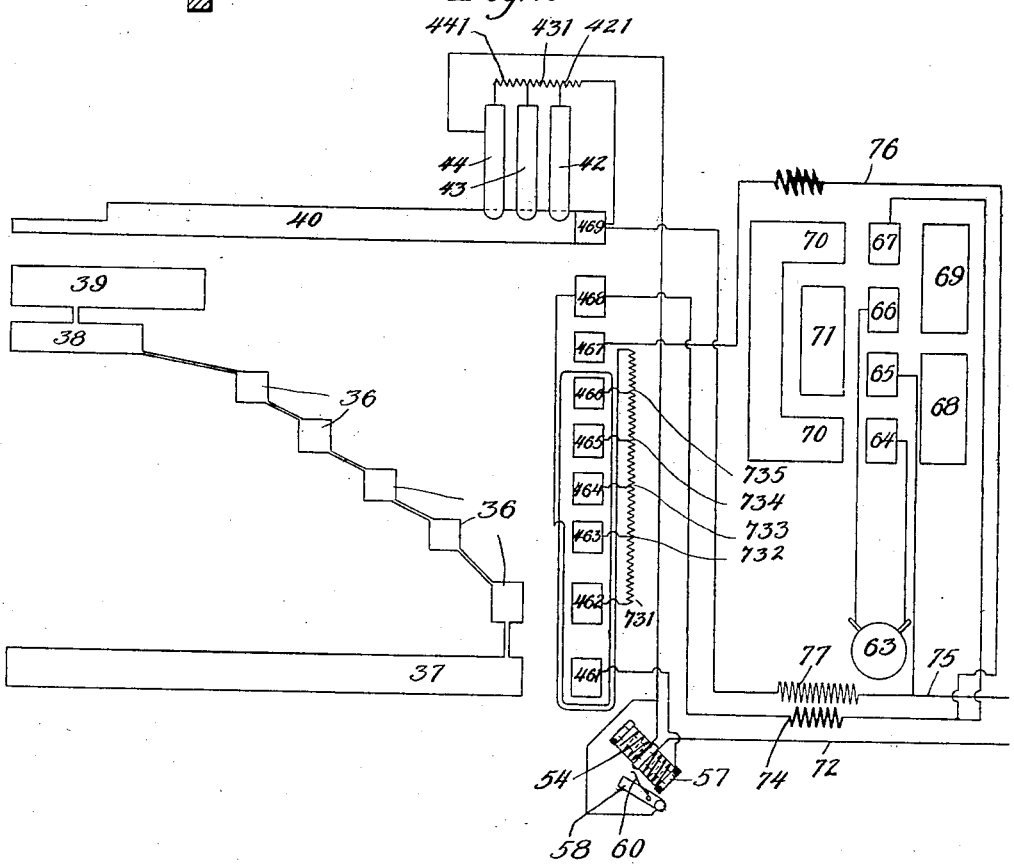
Witnesses:
Wm. Geiger
H. W. Munday
Inventor:
Walter N. Vance
By Munday, Evarts & Adcock,
Attorneys No. 763,031. Patented June 21, 1904.

UNITED STATES PATENT OFFICE.

WALTER N. VANCE, OF CHICAGO, ILLINOIS, ASSIGNOR TO THE MIEHLE PRINTING PRESS AND MANUFACTURING COMPANY, OF CHICAGO, ILLINOIS, A CORPORATION OF ILLINOIS.

ELECTRIC-MOTOR CONTROLLER.

SPECIFICATION forming part of Letters Patent No. 763,031, dated June 21, 1904.

Application filed June 29, 1903. Serial No. 163,508. (No model.)

*To all whom it may concern:*

Be it known that I, WALTER N. VANCE, a citizen of the United States, residing in Chicago, in the county of Cook and State of Illinois, have invented a new and useful Improvement in Electric-Motor Controllers, of which the following is a specification.

This invention relates to an improvement in electric-motor-controlling devices to be combined and used with compound-wound electric motors, the principal object being to so construct and combine the controller with the motor that the latter may have its speed increased and diminished by the operation of the controller with minimum waste of power, the controller being so constructed and adapted that changes in speed may be effected by the movement of a single handle and the motor stopped by the movement of the same handle and, further, so constructed that the motor may be reversed by the movement of an auxiliary handle, all these operations being performable subject to certain governing conditions, the aim being to render impossible the performance of the different operations in a wrong sequence and to provide for interrupting the supply of current to the motor in case certain abnormal conditions prevail, and to this end the invention consists in the novel devices and in the novel combinations of parts and devices herein shown or described.

In the accompanying drawings, which form a part of this specification, Figure 1 is a front elevation of the improved controller mechanism, the casing being shown in section. Fig. 2 is a section on line 2 2 of Fig. 1. Fig. 3 is a section on line 3 3 of Fig. 1. Fig. 4 is a sectional view of one of the details of the construction. Fig. 5 is a vertical sectional view of the main controller-cylinder and its adjacent parts. Fig. 6 is a horizontal section taken on line 6 6 of Fig. 5. Fig. 7 is a view similar to Fig. 1 of a portion of the parts shown on said Fig. 1 and upon a somewhat larger scale than said Fig. 1. Fig. 8 is a section on line 8 8 of Fig. 7. Fig. 9 is a horizontal cross-section taken through the controller-cylinder. Fig. 10 is a diagrammatic illustration of the circuits of the compound-wound electric motor and the controller combined therewith to illustrate the operation of the invention.

The present invention is the outcome of my experience in constructing electric motors for the special purpose of driving rapid-running printing-presses. These presses in practice are run at wide variations of speeds from very low to very high speeds, and it is desirable to obtain these varying speeds by the manipulation of a single handle and with as little loss of power in the operation of the motor as possible. I found the usual practice to be to construct a motor whose normal speed was its maximum speed and to vary the speed of the motor by inserting variable resistance in the armature-circuit of the motor, lessening the electromotive force applied to the armature by putting more and more resistance into the armature-circuit. It will be seen that this involves the putting into the armature-circuit of a very considerable amount of resistance when the slower speeds were to be attained and that such an operation is attended by a very considerable and corresponding loss of power by the conversion of a corresponding amount of electric power into heat in the resistance-coils of the variable armature-circuit resistance. In the present invention I overcome this excessive loss of power and maintain perfect control over the speed by manipulating a single handle. I so construct the motor that its normal speed shall be less than its maximum speed and reduce the speed from normal by inserting variable resistance in the armature-circuit until minimum speed is reached and increase the speed from normal upward to the maximum speed by weakening the field of the motor by first shunting the series field-winding and thereafter inserting variable resistance in the shunt field-winding, the controller being so constructed and connected to the circuits of the motor that these operations will be performed successively by the turning of the controller-handle. It will be seen from the foregoing that the waste of power on the lower speeds of the motor in this arrangement is very much reduced, because the normal speed of the motor is far below its maximum speed and only the lower speeds below normal are controlled by the wasteful method of inserting resistance in the armature-circuit, while the speeds above normal up to the maximum speed are controlled by weakening the field, an operation which does not entail any appreciable loss of power. It is essential to perfect control of the motor that it must start from rest only when the controller-handle is moved from the "off" position to the adjacent running position. If the supply of electromotive force fails while the motor is running, the motion will cease. If now the electromotive force is again established, the controller-handle remaining as it was, the motor will start up with whatever it drives unless prevented by a protective device. This I have provided in such form as to automatically open the armature-circuit in case of failure of electromotive force at any time while the motor is running, in which case the circuit cannot be again closed except by first restoring the handle to the off position and then moving it to the successive running positions. Furthermore, it is sometimes desirable to provide for automatically opening the armature-circuit, and thereby stopping the motor, in case the demand on the motor for power exceeds certain limits. This I have done, as hereinafter shown and described in detail.

For a full comprehension of the nature of my invention I will now proceed to describe the construction and operation of the controller and its connection with the circuits of the motor in detail.

In said drawings, 21 is the vertical shaft of the controller-drum. This shaft has at its upper end a handle 22, by means of which it may be turned in the arc of a circle, and this shaft is provided with the usual notched detent-wheel 23 and spring-pawl 24 to center the different positions of the shaft in the manipulation of the handle. There is provided also the usual reversing-switch shaft 25 and the locking mechanism 26, which need no description here.

The hollow drum of the controller is shown at 27, and I produce it very cheaply of rough cast-iron in the form indicated in the drawings most fully at Fig. 5. The cylindric outer surface of this drum is formed into a series of rings or annular projections separated from each other by grooves, upon which rings or annular projections the smoothly-turned copper contact-surfaces to be subsequently described are mounted. The two ends of the drum 27 are cast with heads perforated by conical openings concentric with the drum and with the smaller end of the cone pointing toward the interior of the drum. As a matter of construction this cast-iron controller-drum requires no finishing whatever from the rough casting excepting such machining as will adapt the periphery of the rings to receive the contact-pieces carried thereby, and I purposely leave the surface of the conical openings in the heads of the drum rough as they come from the sand for a special reason. To secure the drum 27 concentrically to the shaft and at the same time to insulate it perfectly from said shaft, I provide two conical wooden plugs 28 and 29, which are slipped upon said shaft— say the upper plug 28 being first put in place— and secured from further upward movement by the cast-iron collar 30, which is pinned by a pin 31 securely to the shaft. Then the drum is slipped over the shaft until the conical aperture at its upper end comes in contact with said plug 28. Then the lower plug 29, being slipped over the shaft, is brought up into contact with the conical opening in the lower end of the drum, and the lower collar 32 is slipped on the shaft and up into contact with said lower wooden plug 29. Then by hydraulic pressure applied to the lower collar 32 I force the two wooden plugs solidly toward the drum and into intimate contact with the conical apertures therein, after which and while so held I drill the shaft for the insertion of the lower pin 33, which secures all these parts firmly together, the drum being now concentric with the shaft and mechanically integral with it, the rough-cast surfaces of the conical apertures, as well as the rough-cast surfaces of the collars 32, also in contact with the wood, forming a union between the wood and the metal which subsequent changes in the wooden plugs will not destroy. This construction not only forms a perfect assembling of the parts in question, a durable union between them, and a perfect electrical insulation of the drum from the rest of the machine, but it is also very simple and cheap to make. For safety of insulation I prefer to cover the periphery of the collars 30 32 with a band 34 of varnished asbestos, and the same provision is made for the annular projections of the iron drum 27, such asbestos covering being shown in the drawings upon the surfaces mentioned, though the designating character is omitted to avoid confusion. Each of the projecting rings of the drum or cylinder is milled parallel to the axis of the cylinder with a groove 35 (see Fig. 9) to receive the copper contact-piece 36, which is held in place by a screw setting into the said ring, as shown in Fig. 9. These contact-pieces 36 are spaced circumferentially upon the successive rings, as indicated in the development shown in the diagrammatic view at Fig. 10, the purpose being so that the rotation of the drum will bring the contact-pieces successively into the line or plane in which the contact-fingers stand. By reference to said development at Fig. 10 it will be noticed that the lowermost ring 37 is provided with a contact that extends through a much greater arc than the contacts 36; also, that the ring 38 is provided with a contact extending through a lesser arc, but which is still greater than the arc of said contacts 36; also, that the ring 39 is provided with a contact-strip extending through an arc greater than that of the ring 38, and, finally, that the upper ring 40, which is not carried upon the drum or cylinder itself, but upon a wooden plug 28, is a continuous band of copper extending entirely around the circumference of said plug. The contact which is to be made with this band 40 is a constant contact of a single finger 41, resting against the periphery of said band, and a variable or adjustable contact by the three fingers 42 43 44, resting against the upper edge of said band and so placed upon their insulating-support 93 that when the drum or cylinder is rotated through a sufficient arc said fingers one after another in succession will come in contact with a cam 45, Fig. 6, made of insulating material, as vulcanized fiber, and be thus lifted one after another out of contact. For each of the contacts 36, 37, 38, and 39 is provided a spring contact-finger, as indicated by the characters 461, 462, 463, 464, 465, 466, 467, and 468, the contact-finger 461 making contact with the lowermost ring or contact 37, the contact-fingers 463, 464, 465, and 466 making contact with the contact-fingers 36, respectively, in their order of position, the contact-finger 467 making contact with the contact-strip 38. These spring contact-fingers, all save the lowermost, 461, are severally secured to fixed terminal blocks 90, Fig. 3, mounted separately on the wooden base 49, these terminal blocks having each a binding-post 91 for its wire and a stop 92 for its spring contact-finger. The lowermost spring contact-finger 461 is pivoted on its terminal block so as to swing about the pivot 47 through an angle of about forty-five degrees in a vertical plane. A sectional view of this pivot 47 and its adjacent parts is shown at Fig. 4. A spring 48, connected to the contact-finger and to the stationary framework and for purposes of insulation to the wooden base-piece 49, exerts its tendency to maintain the pivoted spring contact-finger in the angular position—that is to say, out of the position of possible contact with the contact-strip 37. Mounted on the same pivot 47 is the arm 50, one end of which is provided with a fork 51, setting over a pin 52, carried by the spring-contact 461. On the other end of this arm 50 is mounted the armature 53, belonging to an electromagnet now to be described and most clearly shown at Fig. 7. This magnet is indicated by the character 54, and it is so wound and connected as to be energized at all times while the electromotive force is maintained in the line. This magnet 54 is constructed to be strong enough in its attraction for its armature 53 to hold said armature against the force of the torsion-spring after said armature has once been brought close to its pole, but not strong enough to draw its armature against the force of said spring when the armature and pole have been separated.

Mounted on the stationary framework of the machine is the pivoted arm 55, which stands in the path of an arm 56, adjustably mounted on the lower end of the shaft 21. This arm 55 stands in an inclined position, as will be seen at Fig. 7, so that when not in touch with the arm 56 the arm 55 will by its own weight fall down and be raised up by the movement of the arm 56 in the rotation of the shaft 21. The magnet 54 acts as a stop to the downward swing of both the arm 55 and the hinged contact-finger 461. The upper end of the arm 55 stands in the path of the hinged contact-finger 461 in such position that when the shaft 21 is rotated in one direction to raise said arm 55 this will raise the hinged contact 461 against the torsion of its spring and bring it into position (shown at Fig. 7) where it will be held, as above described, by the action of magnet 54, whatever the subsequent position of arm 55 may be. As the spring-contact finger 461 is alive with the circuit during the operation of the machine, I make the upper part 551 of the arm 55 out of insulating material and prefer for this purpose vulcanized fiber. The arm 56 is so adjusted on the shaft 21 that when the controller-handle is in the off position the arm 56 will have raised the hinged contact-finger 461, through the medium of the arm 55, until said contact-finger is in line with its contact 37 and simultaneously the armature 53 is in contact with the poles of the magnet 54. If this magnet is now energized, the armature 53, and by it the hinged contact-finger 461, will be held in this position, whatever the movement of the controller-handle; but if said magnet 54 is deënergized the hinged contact-finger 461 will not be held up except by the arms 56 and 55 and by them only in the off position.

There is shown in conjunction with the magnet 54 a second magnet 57, the winding of which is connected in series with the armature of the electric motor. 58 is the armature of this latter magnet, resting against an adjusting-screw 59, whereby its fall away from the poles of the magnet may be adjusted to require more or less magnetizing force to bring said armature in contact with the poles of the magnet. Mounted on the armature 58 is a light spring-arm 60, made of metal and connected in the circuit, so that when the armature 58 is lifted slightly this arm 60 will short-circuit the magnet 54, and thus release the armature 53 from the force of its attraction. To further insure and quicken this action, I provide a pin 61, standing in the path of the armature 58, so that said armature at the termination of its stroke will strike one end of this pin with a smart blow and cause the other end of the pin to hit the armature 53 to loosen the latter if it shall stick, positively disengaging said armature. The armature 53 will in turn disengage armature 58 if it should remain in contact with the poles of its magnet 57 when the controller-handle is brought to the off position. This arrangement affords protection against overloading the motor beyond a certain amount, dependent on the adjustment of the pivoted armature 58 by its adjusting-screw 59.

An adaptation of the ordinary blow-out magnet is shown at 62.

The electrical connections as indicated in the diagram are as follows: 63 is the armature of the electric motor. 64, 65, 66, 67, 68, 69, 70, and 71 are the contacts of the ordinary reversing-switch or cylinder. The shaft of this cylinder is shown at 25, the diagram showing the development of these contacts. Suppose the switch to be set so that the contacts 64 and 65 will be united with 68 and the contacts 66 and 67 with 69, which would be the position when the motor was going "ahead." To reverse the motor, the contacts 64 and 67 are brought into touch with the contact 70 and the contacts 65 and 66 with the contact 71. To follow the armature-circuit when the switch is in the ahead, the circuit will be through the line-wire 72 to the heavy winding on the overload-magnet 57. The other end of the heavy winding is grounded on said magnet, from thence to the spring-finger 461. The circuit is here broken if the controller is in the off position, because there will be no contact in such case between the spring-finger 461 and its contact 37; but if the controller is in any of its "on" positions the current will pass through the spring-finger 461 to the contact 37, which is in electrical connection with all of the contacts 36 and the contacts 38 and 39. If the controller be turned in such position that the spring-finger 462 is in touch with its contact 36, the current will pass through said spring-finger 462, thence through all of the armature-resistance 731 732 733 734 735, thence through the blow-out magnet-winding to the spring 468, thence through the series field-winding 74 to the reversing-switch, from the reversing-switch through the armature, thence to the other line-wire 75, and so out to the line. If the spring-finger 463 be the one in contact, that portion of the armature resistance marked 731 will be cut out, and so if the spring-finger 466 be the one in contact all of the armature resistance will be cut out excepting that portion marked 735. If the controller-drum be so far rotated that the contact 39 is brought into touch with the spring-finger 468, then all of the armature resistance is cut out and the motor is working at its normal speed. If the speed is to be still further increased, the drum is turned another notch, and the contact 38 is thus brought into touch with the spring-finger 467, when the series field will be shunted by the wire 76. The shunt field-circuit begins at the magnet 54, one end of the winding of which is grounded on the metal framework of said magnet, the other end of the winding being connected to the shunt-circuit, which passes to the spring-finger 44, thence through said spring-finger 44 to the contact-ring 40, thence to the contact-finger 469, thence through the shunt field-winding 77 of the motor, and thence to the line-wire 75, and so to the line. Now if the speed of the motor is to be still further increased beyond that given by bringing the contact 38 in touch with the spring-finger 467, the drum or cylinder is rotated another notch, which will lift the finger 44 out of contact with the strip 40, so that the shunt field-current will pass through the spring-finger 44, thence through the resistance 441 to the contact-finger 469, thus introducing into the shunt field-circuit the resistance 441. So, too, when still further speed is required a movement of an additional notch will in like manner introduce into said circuit by lifting the spring-finger 43 the additional resistance 431, and, finally, if the drum be turned still another notch the finger 42 will be lifted and the additional resistance 421 introduced into said shunt field-circuit.

The wire 76 must necessarily have a certain resistance, and by selecting this wire so that its resistance shall have a certain relation to the resistance of the series winding it is possible to weaken the magnetizing force of the series winding a certain definite amount when the finger 467 bears on its contact 39 or to short-circuit it altogether. I prefer to do the former in the case of driving machinery having heavy reciprocating parts, as some series magnetizing force is needed to keep the fluctuations of current in bounds. Decreasing the resistance of the wire 76 will increase all the speeds which are above the normal speed.

I claim—

1. The combination of the rotatable contact-bearing drum, the opposing contacts disposed alongside of said drum, one of which is hinged or pivoted and arranged so that its contact-making part may swing out of apposition or position of possible contact with its corresponding rotatable contact on said drum, means as a spring tending always to swing said hinged contact-making part out of apposition, and the magnet adapted to hold said part in apposition, substantially as specified.

2. The combination of the rotatable contact-bearing drum, the opposing contacts disposed alongside of said drum, one of which is hinged or pivoted and arranged so that its contact-making part may swing out of apposition or position of possible contact with its corresponding rotatable contact on said drum, means as a spring tending always to swing said contact-making part out of apposition, the magnet adapted to hold said part in apposition, and the resetting device consisting of an arm having motion such as to force the hinged contact-making part into apposition, said arm receiving motion from said rotatable drum, substantially as specified.

3. The combination of the rotatable contact-bearing drum, the opposing contacts disposed alongside of said drum, one of which is hinged or pivoted, and arranged so that its contact-making part may swing out of apposition or position of possible contact with its corresponding rotatable contact on said drum, means as a spring tending always to swing said contact-making part out of apposition, the magnet adapted to hold said part in apposition, the resetting device consisting of an arm having motion such as to force the hinge contact-making part onto apposition, said arm receiving motion from the rotatable drum, and a second arm adjustably mounted on said drum for imparting said motion, substantially as specified.

4. The combination of a rotatable contact-bearing drum, the opposing contacts disposed alongside of said drum one of which is hinged or pivoted, and arranged so that its contact-making part may swing out of apposition or position of possible contact with its corresponding rotatable contact on said drum, means as a spring tending always to swing said hinged contact-making part out of apposition, the magnet adapted to hold said part in apposition, and a second magnet and a movable armature therefor, said armature being constructed and acting to deënergize the first magnet, substantially as specified.

5. The combination of a rotatable contact-bearing drum, the opposing contacts disposed alongside of said drum, one of which is hinged or pivoted and arranged so that its contact-making part may swing out of apposition or position of possible contact with its corresponding rotatable contact on said drum, means as a spring tending always to swing said hinged contact-making part out of apposition, the magnet adapted to hold said part in apposition, a second magnet and a movable armature therefor, said armature being constructed and acting to deënergize the first magnet, and means, as a sliding pin, whereby the movement of said armature of the second magnet is made to forcibly disengage the armature of the first magnet, substantially as specified.

6. The combination of a rotatable contact-bearing drum, the opposing contacts disposed alongside of said drum, one of which is hinged or pivoted and arranged so that its contact-making part may swing out of apposition or position of possible contact with its corresponding rotatable contact on said drum, means as a spring tending always to swing said hinged contact-making part out of apposition, the magnet adapted to hold said part in apposition, and a resetting device operated by the movement of the drum, so arranged that the said hinged contact part will be forced into apposition only when the drum in its rotation reaches the off position, substantially as specified.

7. The combination with the contact-carrying drum, of a peripheral contact carried therewith, a peripheral contact part in apposition thereto, and one or more movable contact-fingers bearing on the edge of said peripheral contact, and a cam device carried with the drum for lifting said edge contact part or parts out of contact as the drum moves, substantially as specified.

8. The combination in a motor and its controller, of a rotatable contact in the controller arranged to make or break the armature-circuit of the motor through an apposite pivoted contact, means as a spring tending to move said pivoted contact out of apposition, an electromagnet adapted to hold said pivoted contact in apposition, and so wound and connected that its magnetizing force shall vary as a function of the line electromotive force, a second magnet, so wound and connected that its magnetizing force shall vary as a function of the armature-current, and having a movable armature adapted to deënergize the first magnet and forcibly disengage the armature of said first magnet, substanitally as specified.

9. In combination, a motor adapted to run normally at a speed less than its maximum; a variable resistance adapted to be cut into the armature-circuit to reduce the speed of the motor to minimum; means for shunting the series field-winding, a variable resistance adapted to be cut into the shunt field-winding after it is shunted; and a controller constructed and adapted when properly moved to successively make the necessary electrical circuit connections to raise the motor from minimum to maximum speed and to reverse these operations in order and finally open the armature-circuit as the controller is reversed.

10. In combination, a motor adapted to run normally at a speed less than its maximum; a variable resistance adapted to be cut into the armature-circuit to reduce the speed of the motor to minimum; means for shunting the series field-winding, a variable resistance adapted to be cut into the shunt field-winding after it is shunted; and a controller constructed and adapted when properly moved, to successively make the necessary electrical circuit connections to raise the motor from minimum to maximum speed, and to reverse these operations in order and finally open the armature-circuit as the controller is reversed; with means for automatically opening the armature-circuit in case of failure of electromotive force at any time during the running of the motor, and keeping it open until the controller has been returned to "off" position, substantially as described.

11. In combination, a motor adapted to run normally at a speed less than its maximum; a variable resistance adapted to be cut into the armature-circuit to reduce the speed of the motor to minimum; means for shunting the series field-winding, a variable resistance adapted to be cut into the shunt field-winding after it is shunted; and a controller constructed and adapted when properly moved, to successively make the necessary electrical circuit connections to raise the motor from minimum to maximum speed, and to reverse these operations in order and finally open the armature-circuit as the controller is reversed; with means for automatically opening the armature-circuit and stopping the motor in case of excessive load on the motor; and means for automatically opening the armature-circuit in case of failure of electomotive force at any time during the running of the motor, and keeping it open until the controller has been returned to "off" position, substantially as described.

12. In combination, the controller-shaft, the hollow cylindrical drum surrounding said shaft and having conical end openings; with conically-tapered plugs closely fitted to the shaft and driven into the opposite conical end opening of said drum to support and center the drum on the shaft, substantially as described.

13. The combination of the controller-shaft, the cast-iron cylinder surrounding the shaft, carrying peripheral contacts, and having conical end openings, with the small ends of the openings inward, conical wooden plugs fitted around and against the shaft and driven into said conical end openings of the drum to support and center the same upon the shaft, and metal collars binding said plugs to the shaft, substantially as and for the purpose described.

14. In a controller for an electric motor having a shunt field-winding, the combination of a magnet energized by the shunt field-current, with a switch operated by a handle adapted to open and close the armature-circuit of the motor, so arranged that it cannot be closed unless the said magnet is first energized, and can be closed when said magnet is energized, substantially as specified.

15. In a controller for an electric motor having a shunt field-winding, the combination of a magnet energized by the shunt field-current, with a switch operated by a handle adapted to open and close the armature-circuit of the motor, so arranged that it cannot be closed unless the said magnet is first energized and can be closed when said magnet is energized, and means as a spring for automatically opening said switch independent of the handle, when said magnet is deënergized, substantially as specified.

16. The combination of the rotatable contact-carrying-drum, the opposing contacts disposed alongside of said drum, one of which is constructed so that its contact-making part may move transversely of its related contact on said drum out of position of possible contact therewith, substantially as specified.

17. The combination of the rotatable contact-bearing drum, the opposing contacts disposed alongside of said drum, one of which is hinged or pivoted so that its contact-making part may move transversely of its corresponding rotatable contact on said drum out of position for possible contact therewith, and means as a spring tending always to move said hinged contact-making part into non-contacting position, substantially as specified.

18. The combination of the rotatable drum, a contact thereon, and an opposed contact movable transversely of the contact on the drum, and means acting to normally hold said movable contact out of position to engage the drum-contact; with a magnet adapted to retain the movable contact in the plane of the contact on the drum so it may engage therewith, substantially as described.

19. The combination of a rotatable drum, a contact thereon rotating therewith; a movable contact, movable transversely of the plane of the contact on the drum, means as a spring for normally holding said movable contact displaced out of position to engage the drum-contact, and an electromagnet adapted to hold the movable contact in the plane of the drum-contact in position to engage therewith, substantially as described.

WALTER N. VANCE.

Witnesses:
H. M. MUNDAY,
EDW. S. EVARTS.